(12) United States Patent
Huang et al.

(10) Patent No.: US 12,117,567 B2
(45) Date of Patent: Oct. 15, 2024

(54) LIDAR AND LASER MEASUREMENT TECHNIQUES

(71) Applicant: AQRONOS, INC., Broomfield, CO (US)

(72) Inventors: Shu-Wei Huang, Broomfield, CO (US); Peizhe Li, Los Angeles, CA (US)

(73) Assignee: AQRONOS, INC., Broomfield, CO (US)

( * ) Notice: Subject to any disclaimer, the term of this patent is extended or adjusted under 35 U.S.C. 154(b) by 0 days.

(21) Appl. No.: 18/295,380

(22) Filed: Apr. 4, 2023

(65) Prior Publication Data

US 2023/0251358 A1    Aug. 10, 2023

Related U.S. Application Data

(63) Continuation of application No. 16/761,322, filed as application No. PCT/US2018/059033 on Nov. 2, 2018, now Pat. No. 11,619,721.

(Continued)

(51) Int. Cl.
*G01S 17/34* (2020.01)
*G01S 7/481* (2006.01)
(Continued)

(52) U.S. Cl.
CPC .......... *G01S 7/4911* (2013.01); *G01S 7/4814* (2013.01); *G01S 7/4817* (2013.01); *G01S 17/34* (2020.01); *G02B 26/101* (2013.01); *G02B 26/12* (2013.01); *G02B 27/283* (2013.01); *H01S 3/06791* (2013.01); *H01S 3/094076* (2013.01);
(Continued)

(58) Field of Classification Search
CPC .... G01S 7/4911; G01S 7/4814; G01S 7/4817; G01S 17/34; G01S 17/89; G01S 7/4811; G01S 17/02; G01S 17/36; G02B 26/101; G02B 26/12; G02B 27/283; H01S 3/06791; H01S 3/094076; H01S 3/0941; H01S 3/101; H01S 3/1106; H01S 3/0085; H01S 3/08022; H01S 3/1026; H01S 3/1112;
(Continued)

(56) References Cited

U.S. PATENT DOCUMENTS 4,846,571 A    7/1989  Jelalian et al.
5,022,760 A    6/1991  Danko et al.
(Continued)

FOREIGN PATENT DOCUMENTS

JP    H02173519 A    7/1990
JP    2014160076 A   9/2014
(Continued)

OTHER PUBLICATIONS

International Search Report and Written Opinion for PCT/US2018/059033 dated Feb. 15, 2019, 9 pages.
(Continued)

*Primary Examiner* — Xinning(Tom) Niu
(74) *Attorney, Agent, or Firm* — Sheppard, Mullin, Richter & Hampton LLP; Xin Xie (57) ABSTRACT

A dual-comb measuring system is provided. The dual comb measuring system may include a bi-directional mode-locked femtosecond laser, a high-speed rotation stage, and a fiber coupler. The high-speed rotation stage may be coupled to a pump diode.

4 Claims, 9 Drawing Sheets

Related U.S. Application Data (60) Provisional application No. 62/581,267, filed on Nov. 3, 2017.

(51) Int. Cl.

| | | |
|---|---|---|
| *G01S 7/4911* | (2020.01) | |
| *G02B 26/10* | (2006.01) | |
| *G02B 26/12* | (2006.01) | |
| *G02B 27/28* | (2006.01) | |
| *H01S 3/067* | (2006.01) | |
| *H01S 3/094* | (2006.01) | |
| *H01S 3/0941* | (2006.01) | |
| *H01S 3/101* | (2006.01) | |
| *H01S 3/1106* | (2023.01) | |
| *G01S 17/89* | (2020.01) | |

(52) U.S. Cl.
CPC ............ *H01S 3/0941* (2013.01); *H01S 3/101* (2013.01); *H01S 3/1106* (2013.01); *G01S 17/89* (2013.01)

(58) Field of Classification Search
CPC ......... H01S 3/067; G01J 3/108; G01J 3/0218; G01J 3/10; G01C 15/002
See application file for complete search history.

(56) References Cited

U.S. PATENT DOCUMENTS

| | | |
|---|---|---|
| 5,157,745 A | 10/1992 | Ames |
| 6,373,565 B1 | 4/2002 | Kafka et al. |
| 2008/0130702 A1 | 6/2008 | Spariosu et al. |
| 2010/0080386 A1 | 4/2010 | Donnangelo et al. |
| 2013/0003766 A1* | 1/2013 | Savchenkov ........... H01S 5/142 372/32 |
| 2013/0311141 A1* | 11/2013 | Peng ..................... H01J 49/022 702/191 |
| 2015/0185246 A1 | 7/2015 | Dakin et al. |
| 2016/0116288 A1 | 4/2016 | Song et al. |
| 2016/0274222 A1 | 9/2016 | Yeun |
| 2018/0210068 A1* | 7/2018 | Efimov ................. H04B 10/60 |
| 2018/0216996 A1 | 8/2018 | Kieu |
| 2019/0011558 A1* | 1/2019 | Crouch .................... G08G 1/16 |
| 2019/0310372 A1* | 10/2019 | Crouch .................... G01S 17/89 |
| 2020/0278432 A1* | 9/2020 | Thorpe ................. G01S 7/4915 |

FOREIGN PATENT DOCUMENTS

| | | |
|---|---|---|
| JP | 2014202716 A | 10/2014 |
| WO | 2007076600 A1 | 7/2007 |
| WO | 2016190913 A2 | 12/2016 |
| WO | 2016196677 A1 | 12/2016 |

OTHER PUBLICATIONS

Mehravar et al., "Real-time dual-comb spectroscopy with a free-running bidirectionally mode-locked fiber laser", Applied Physics letters, 108, 2016, Nov. 4, 2023, 5 pages.

Saito et al., "Bidirectional dual-comb fiber laser using SWNT film", The Japan Society of Applied Physics, 2017, 2 pages.

Vali et al., "Fresnel-Fizeau effect in a rotating optical fiber ring interferometer", Applied Optics, Oct. 1977, vol. 16, No. 10, pp. 2605-2607.

* cited by examiner

LIDAR AND LASER MEASUREMENT TECHNIQUES

CROSS-REFERENCE TO RELATED APPLICATION

This application is a continuation of U.S. application Ser. No. 16/761,322, filed on May 4, 2020, which is a national stage application under 35 USC 371 of PCT/US2018/059033, filed Nov. 2, 2018, which claims the benefit of U.S. Provisional Application No. 62/581,267, filed Nov. 3, 2017. The entire contents of all of the above-identified applications are incorporated herein by reference.

TECHNICAL FIELD

Embodiments of the present invention generally relate to the field of LiDAR and lasers, and more specifically to bi-directional lasers compatible with dual comb measurement techniques and also to dual-sideband, frequency-modulated continuous-wave (FMCW) measurement techniques.

BACKGROUND

Dual-comb spectroscopy is an emerging new spectroscopic tool that exploits the frequency resolution, frequency accuracy, broad bandwidth, and brightness of frequency combs for ultrahigh-resolution, high-sensitivity broadband spectroscopy. By using two coherent frequency combs, dual-comb spectroscopy allows a sample's spectral response to be measured on a comb tooth-by-tooth basis rapidly and without the size constraints or instrument response limitations of conventional spectrometers.

Dual-comb technique has enabled exciting applications in high resolution spectroscopy, precision distance measurements, and 3D imaging. Major advantages over traditional methods can be achieved with the dual-comb technique. For example, dual-comb spectroscopy provides orders of magnitude improvement in acquisition speed over standard Fourier-transform spectroscopy while still preserving the high-resolution capability. Wider adoption of the technique has, however, been hindered by the need for complex and expensive ultrafast laser systems.

Fourier-transform spectroscopy is a tool for analyzing chemical samples in scientific research as well as the chemical and pharmaceutical industries. Recently, its measurement speed, sensitivity, and precision have been shown to be significantly enhanced by using dual-frequency combs. Moreover, recent demonstrations of inducing nonlinear effects with ultrashort pulses have enriched the utility of dual-comb spectroscopy. However, wide acceptance of this technique is hindered by its requirement for two frequency combs and active stabilization of the combs.

The ability to determine absolute distance to an object is one of the most basic measurements of remote sensing. High precision ranging has important applications in both large-scale manufacturing and in future tight formation flying satellite missions, where rapid and precise measurements of absolute distance are critical for maintaining the relative pointing and position of the individual satellites. Using two coherent broadband fiber-laser frequency comb sources, a coherent laser ranging system that combines the advantages of time-of-flight and interferometric approaches to provide absolute distance measurements, simultaneously from multiple reflectors and at low power, is known. The pulse time-of flight yields a precision of 3 mm with an ambiguity range of 1.5 m in 200 ms. Through the optical carrier phase, the precision is improved to better than 5 nm at 60 ms, and through the radio-frequency phase the ambiguity range is extended to 30 km, potentially providing 2 parts in 1013 ranging at long distances. However, generally only either the object distance or the object speed can be determined at one time.

Dual-comb measurement techniques have shown great promises in applications that demand accuracy and stability, such as precision spectroscopy and coherent lidar. However, widespread use of dual-comb measurement techniques is currently limited by the requirement of two mode-locked femtosecond laser frequency combs and high-speed, phase-lock loop electronics to create the necessary mutual coherence. Thus, there is a need for better laser frequency combs. There is also a need for measurement techniques that can unambiguously determine the object distance and the object speed in just one measurement.

FMCW LiDAR is yet another promising laser ranging technique. In the FMCW LiDAR system, the object distance is linearly encoded as the measured electrical frequency. Traditionally, the object speed also leads to an offset in the measured electrical frequency and consequently results in ambiguity in distance unless another independent measurement on the object speed is conducted. Using the dual-sideband method, described in various embodiments herein, this problem is solved, and both the object distance and the object speed can be unambiguously determined in just one measurement.

SUMMARY

Embodiments of the invention include a dual-comb measuring system. The dual comb measuring system may include a bi-directional mode-locked femtosecond laser, a high-speed rotation stage, and a fiber coupler. The high-speed rotation stage may be coupled to a pump diode.

This summary and the following detailed description are merely exemplary, illustrative, and explanatory, and are not intended to limit, but to provide further explanation of the invention as claimed. Other systems, methods, features, and advantages of the example embodiments will be or will become apparent to one skilled in the art upon examination of the following figures and detailed description.

BRIEF DESCRIPTION OF THE FIGURES

The figures provided are diagrammatic and not drawn to scale. Variations from the embodiments pictured are contemplated. Accordingly, illustrations in the figures are not intended to limit the scope of the invention.

DETAILED DESCRIPTION

The following disclosure describes various embodiments of the present invention and method of use in at least one of its preferred, best mode embodiment, which is further defined in detail in the following description. Those having ordinary skill in the art may be able to make alterations and modifications to what is described herein without departing from its spirit and scope. While this invention is susceptible to different embodiments in different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated. All features, elements, components, functions, and steps described with respect to any embodiment provided herein are intended to be freely combinable and substitutable with those from any other embodiment unless otherwise stated. Therefore, it should be understood that what is illustrated is set forth only for the purposes of example and should not be taken as a limitation on the scope of the present invention.

In the following description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

Figure 1:
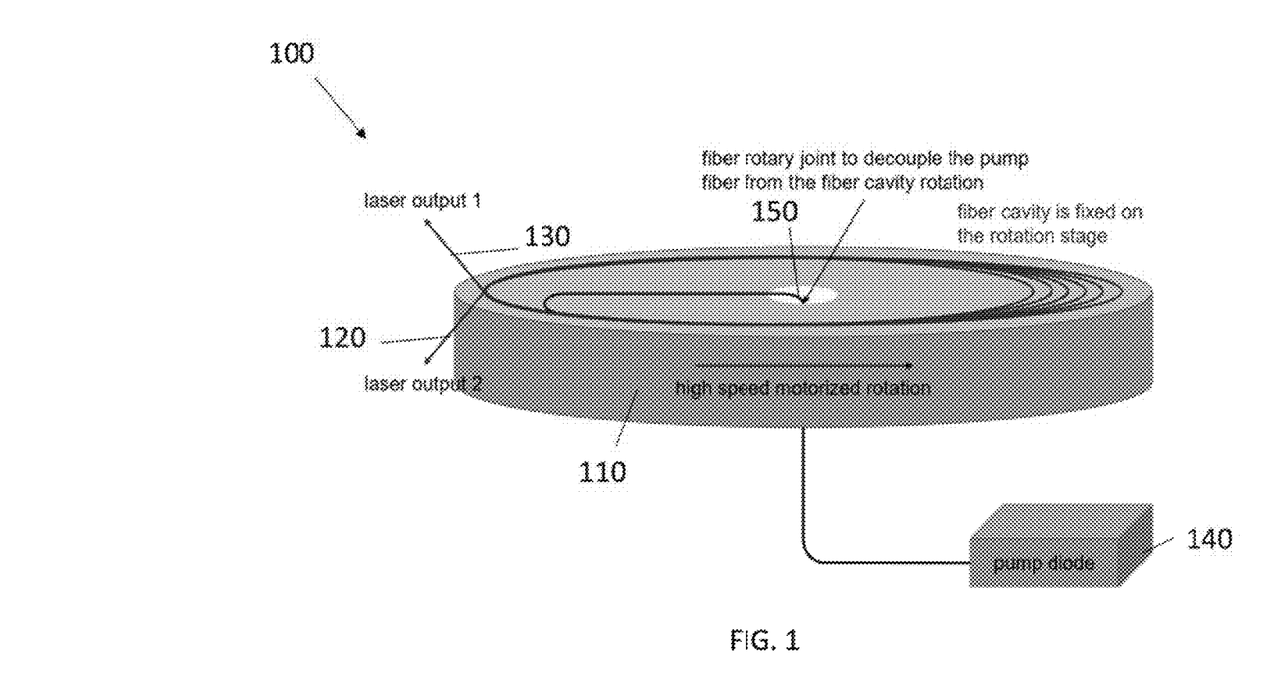
FIG. 1 illustrates a bi-directional mode-locked femtosecond laser on a high-speed rotation stage, according to exemplary embodiments of the present invention.

Turning to the figures, FIG. 1 illustrates a bi-directional laser which is inherently compatible with dual-comb measurement techniques 100A alone without an additional laser. As illustrated, in some embodiments, the bi-directional laser may utilize the Sagnac effect to create a repetition rate difference between the bi-directional laser outputs 120, 130. Other principles to create a repetition rate difference may also be used. For a single frequency laser gyro in rotation, due to the Sagnac effect, the lasing frequencies in the clockwise direction and the counterclockwise direction will differ by $\Delta f_{opt} = \alpha \cdot f_{opt} \cdot \Omega$, where $\alpha$ is a constant depending on the laser cavity design, $f_{opt}$ is the lasing frequency when the gyro is at rest, and $\Omega$ is the angular rotation speed.

Similarly, as illustrated in FIG. 1, if a bi-directional mode-locked femtosecond laser is put on a high-speed rotation stage 110 coupled to a pump diode 140, the Sagnac effect may also introduce a repetition rate difference between the laser outputs 120, 130 in the clockwise direction and the counterclockwise direction. The repetition rate difference may be proportional to the angular speed of the rotation stage 110 and it can be expressed as $\Delta f_{rep} = \alpha \cdot f_{rep} \cdot \Omega$, where $\alpha$ is the same cavity design dependent constant and $f_{rep}$ is the repetition rate when the system is at rest. As illustrated in FIG. 1, there is no need to build two mode-locked femtosecond lasers. In some embodiments, the two laser outputs 120, 130 may be combined as shown in FIG. 1 using a standard fiber coupler, and then we have the source for dual-comb measurements. Any other method of combining the two laser outputs 120, 130 may also be used. In the standard two-laser implementation of dual-comb measurement, the two laser cavities fluctuate independently with their noise completely uncorrelated. Thus, high speed feedback electronics may be necessary to lock the two otherwise independent cavities and ensure the mutual coherence between the two lasers. Additional information can be found in Appendices A and B, which are incorporated herein by reference in their entirety. In some embodiments, the bi-directional laser outputs 120, 130 share the same cavity, and thus any linear cavity fluctuation is equally experienced by the two bi-directional laser outputs. Because of this common noise characteristics, the two laser outputs 120, 130 may be mutually coherent in nature even without the need of high-speed phase-lock loop electronics. The rotation stage 110 may also include a fiber rotary joint 150 to decouple the pump fiber from the cavity rotation.

Recently there is an increasing interest in applying bidirectional fiber lasers to dual-comb measurement systems due to the reduced system complexity and lower cost. Widespread use of dual-comb measurement techniques is currently limited by the requirement of two mode-locked femtosecond laser frequency combs and high-speed phase-lock loop electronics. In some embodiments, by replacing the two mode-locked lasers with a bidirectional fiber laser, the cost of laser may be reduced by half. In addition, high speed phase-lock loop electronics may no longer be necessary as discussed in the previous paragraph, cutting down the system complexity and cost even more. Currently, the existing technology has the fiber laser cavity at rest, thus requiring the cavity to be asymmetric. Further, unequal nonlinearity has to be introduced for the repetition rates of the two directions to be different. Due to the asymmetric cavity and the required nonlinearity, cavity noise experienced by the two directions can no longer be perfectly canceled (only linear cavity fluctuation is equally experienced by the two directions). Thus, the bidirectional laser outputs still gradually drift away from each other and mutual coherence will be lost unless a slow feedback is implemented. Furthermore, to ensure the laser stability, the asymmetry and the nonlinearity cannot be set too high and thus the repetition rate difference is typically limited to <100 Hz, which consequently limits the data acquisition rate of the dual-comb measurement system.

On the other hand, in some embodiments, the bi-directional laser using the dual-comb measurement system may utilize the Sagnac effect, which is linearly controllable by the speed of the rotation stage. As the repetition rate difference may not depend on the cavity asymmetry and the nonlinearity anymore, in some embodiments, the gradual loss of mutual coherence as well as increase the data acquisition rate can be eliminated. In some embodiments, a readily available motorized rotation stage with a speed of 10,000 rpm ($\Omega$) may be used so that a repetition rate difference ($\Delta f_{rep}$) of 2 kHz, i.e., more than an order of magnitude enhancement compared to the prior art may be achieved. Any other kind of rotation stage may also be used. With a high-speed rotation stage that has a speed of 50,000 rpm, the repetition rate difference may be further increased to the level of 10 kHz. Further, as the repetition rate is linearly proportional to the rotation speed ($\Delta f_{rep} = \alpha \cdot f_{rep} \cdot \Omega$), it may be tuned easily by only changing the speed of the rotation stage and recalibrated by keeping track of the motor's rotation speed. Besides, the high-speed rotation increases the system's moment of inertia and thus makes the whole system more stable against any disturbance in the environment (just like a spinning bullet has a more stable projectile).

Figure 2A:
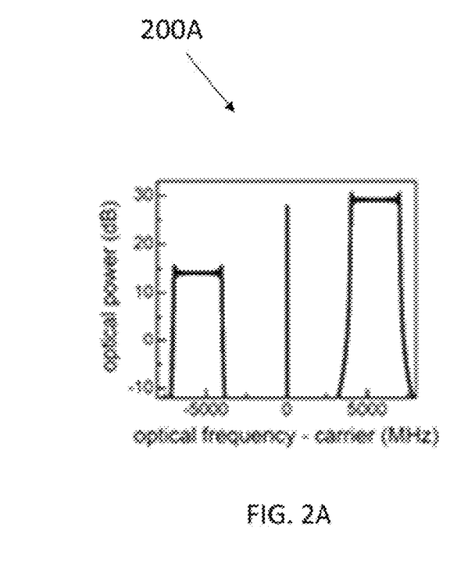
FIG. 2A illustrates a graph where only a positive sideband is utilized to do the ranging measurement.
Figure 2B:
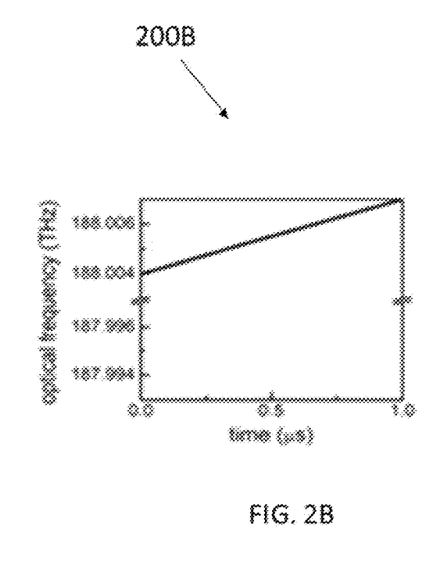
FIG. 2B illustrates an optical frequency graph of the positive sideband as a function of time.
Figure 2C:
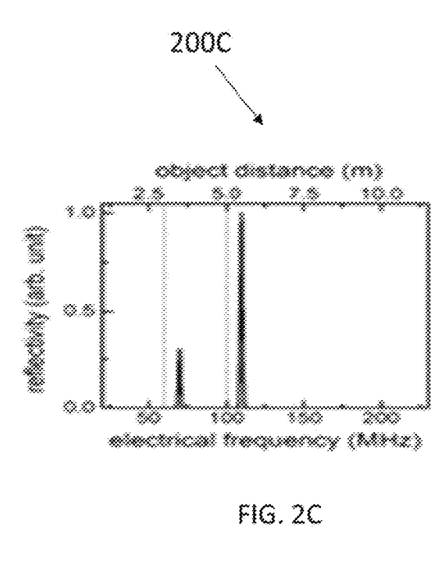
FIG. 2C illustrates a standard graph of an FMCW LiDAR result with a weakly and strongly reflected object.

FIGS. 2A-2C illustrate graphs associated with the standard carrier suppressed with a single side band that depict traditional FMCW LiDAR principle. FIG. 2A illustrates a graph 200A depicting that the carrier and the negative sideband are suppressed and only the positive sideband is utilized to do the ranging measurement. FIG. 2B illustrates the optical frequency graph 200B of a positive sideband as a function of time, showing a positive slope of the frequency sweep (VT). FIG. 2C illustrates a standard FMCW LiDAR result graph 200C with a weakly reflected object at 3 m (L=3 m) and a strongly reflected object at 5 m (L=5 m). In the FMCW LiDAR system, the object distance is linearly encoded as the measured electrical frequency with the equation $f_M = 2L/c\Delta/T + f_D$ where c is the speed of light and $f_D$ is the Doppler frequency resulting from the object's speed. As shown by the equation, the object speed leads to an offset in the measured electrical frequency and consequently results in distance ambiguity unless another independent measurement on the object speed is conducted.

Figure 3A:
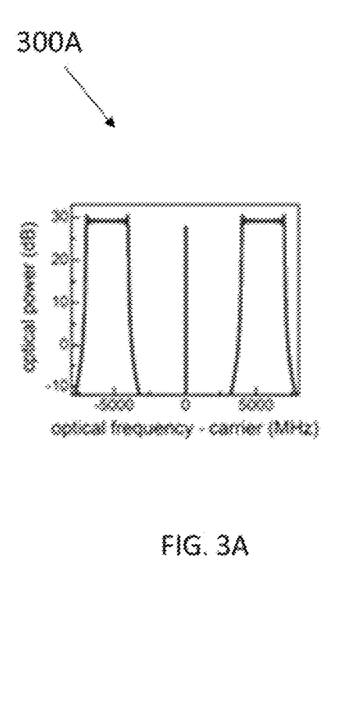
FIG. 3A illustrates a graph of when only a carrier is suppressed in a dual-sideband FMCW LiDAR, according to exemplary embodiments of the present invention.
Figures 3B, 3C:
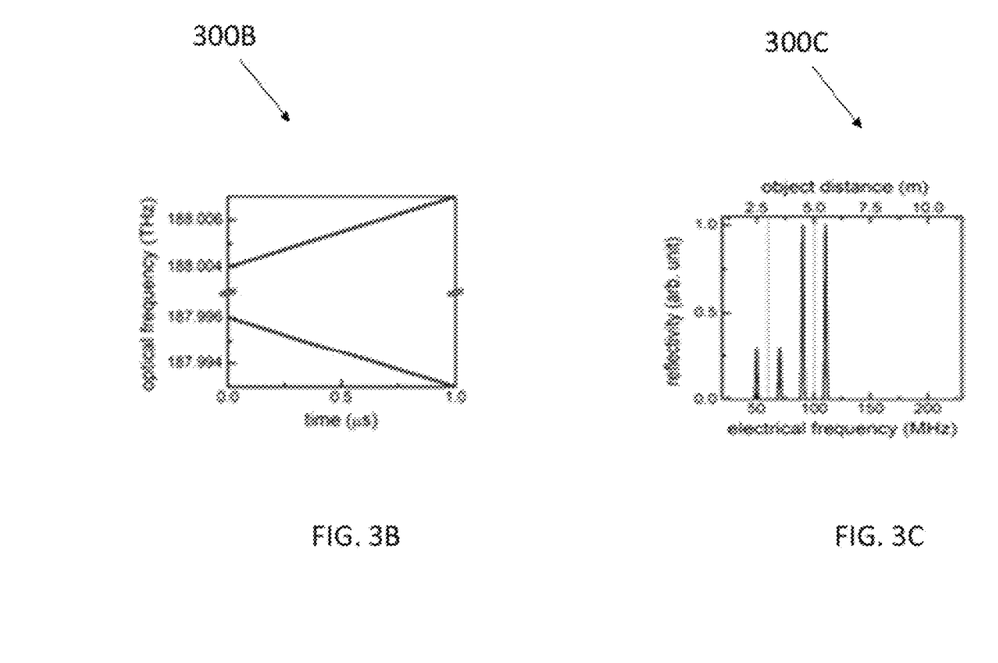
FIG. 3B illustrates an optical frequency graph of both sidebands as a function of time, according to exemplary embodiments of the present invention.
FIG. 3C illustrates a graph of an FMCW LiDAR result with a weakly and strongly reflected object, according to exemplary embodiments of the present invention.

FIGS. 3A-3C illustrate graphs associated with a carrier suppressed dual sideband that depict exemplary dual-sideband FMCW LiDAR principle. FIG. 3A illustrates a graph 300A of when only the carrier is suppressed in the dual-sideband FMCW LiDAR. Both the positive and the negative sidebands may be utilized to do the ranging measurement. FIG. 3B illustrates an optical frequency graph 300B of both sidebands as a function of time. There may be a simultaneous positive slope of the frequency sweep and a negative slope of the frequency sweep. FIG. 3C illustrates an exemplary result graph 300C from an exemplary dual-sideband FMCW LiDAR, again with a weakly reflected object at 3 m (L=3 m) and a strongly reflected object at 5 m (L=5 m). For each object, there may be two measured electrical frequencies, one upshifted $f_{M,u}$ and one downshifted $f_{M,d}$ by the Doppler frequency. In some embodiments, the dual-sideband method may be used to simultaneously and unambiguously determine both the object distance and the object speed in just one measurement. The object distance and speed may be calculated by averaging and differencing the two electrical frequencies ($f_{M,u}$ and $f_{M,d}$), respectively.

Figure 4:
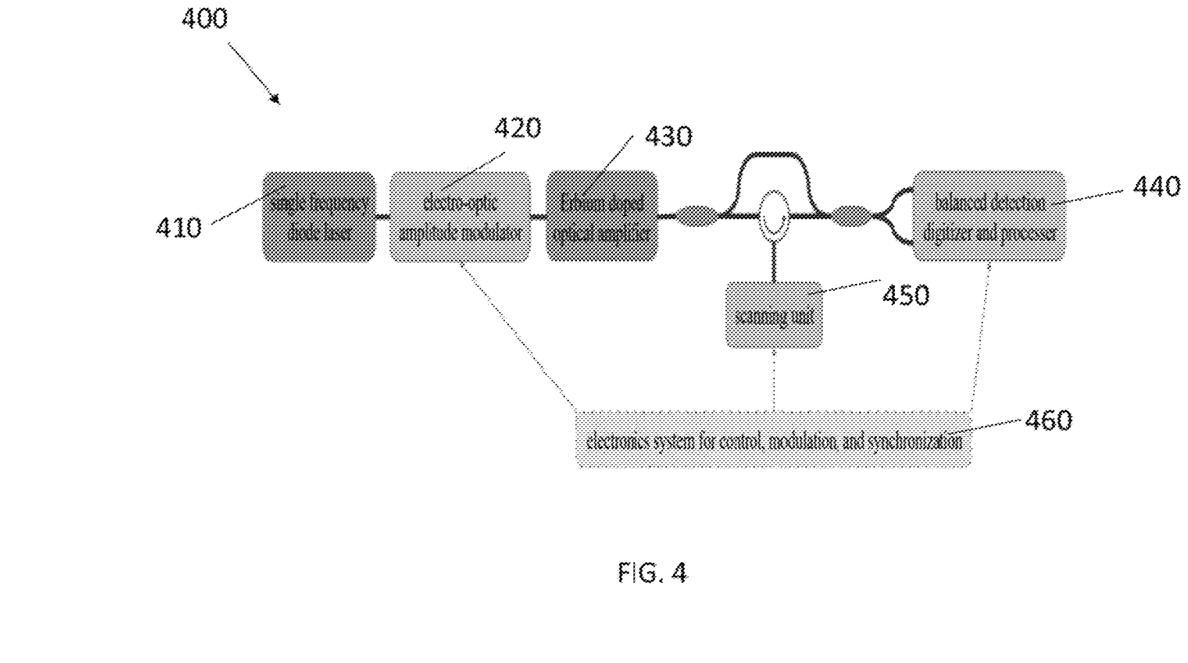
FIG. 4 illustrates a schematic view of a dual-sideband FMCW LiDAR system, according to exemplary embodiments of the present invention.

FIG. 4 illustrates a schematic view of a dual-sideband FMCW LiDAR system 400A. A single frequency diode laser 410 may be fed to an electro-optic amplitude modulator ("EOM") 420. The EOM 420 may be used to create the two sidebands from the single frequency diode laser 410. The EOM 420 bias voltage is carefully chosen to suppress the carrier frequency. The Erbium doped optical amplifier 430 may then be used to boost the optical power to 3W. The 2D scanning unit 450 may be controlled by a computing system 460 to direct the light to the region of interest and eventually form LiDAR images. Balanced detection technique 440 may also be incorporated to improve the measurement sensitivity so the dual-sideband FMCW LiDAR system 400A can measure an object with 10% reflectivity at a distance of 120 m.

Figure 5:
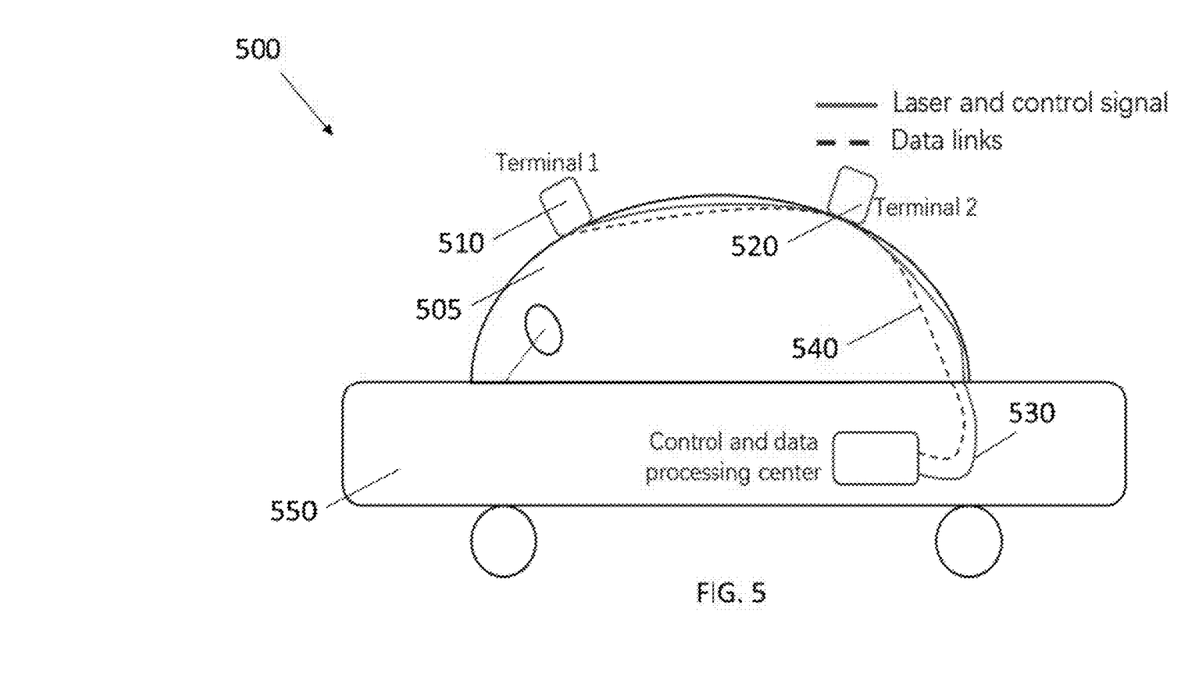
FIG. 5 illustrates a dual sideband FMCW LiDAR system, according to exemplary embodiments of the present invention.

An exemplary LiDAR system that is currently available is the one from Velodyne. The Velodyne LiDAR system involves mechanical rotation. It uses sixty-four lasers and sixty-four detectors to cover different vertical angles. Sixteen lasers and thirty-two detectors are in one group. However, the major drawback of this LiDAR system is the lower rotation speed and complicated design of the LiDAR system. Another available LiDAR system is the one from Quanenergy. It uses an optical phase array to scan for objects, which steers the light direction by controlling the phase of each antenna. However, the major drawback of that system is that as the spot quality is poor, it is difficult to detect an object using the system over long distances. FIG. 5 illustrates a dual sideband FMCW LiDAR system 500, according to exemplary embodiments of the present invention. The LiDAR system mainly includes three parts: modulated light generation unit, transceiver unit 505, and control and processing unit 550.

The transceiver unit 505 have one or more transceiver terminals 510 and 520. It may have laser and control signal 530 and data links 540. It may also have a control and signal processing unit 550. The control and signal processing unit 550 may be separated from the transceiver unit 505, which makes the in-car system layout of the LiDAR system 500 more flexible. The transceiver unit 550 may be placed on top of the vehicle while the control and signal processing unit 550 may be placed in the car. And the control signal may be delivered to the transceiver unit through long electrical cable, while the receiving light signal is sent back to the signal processing unit 550 through a long SMF-28 fiber.

Figure 6:
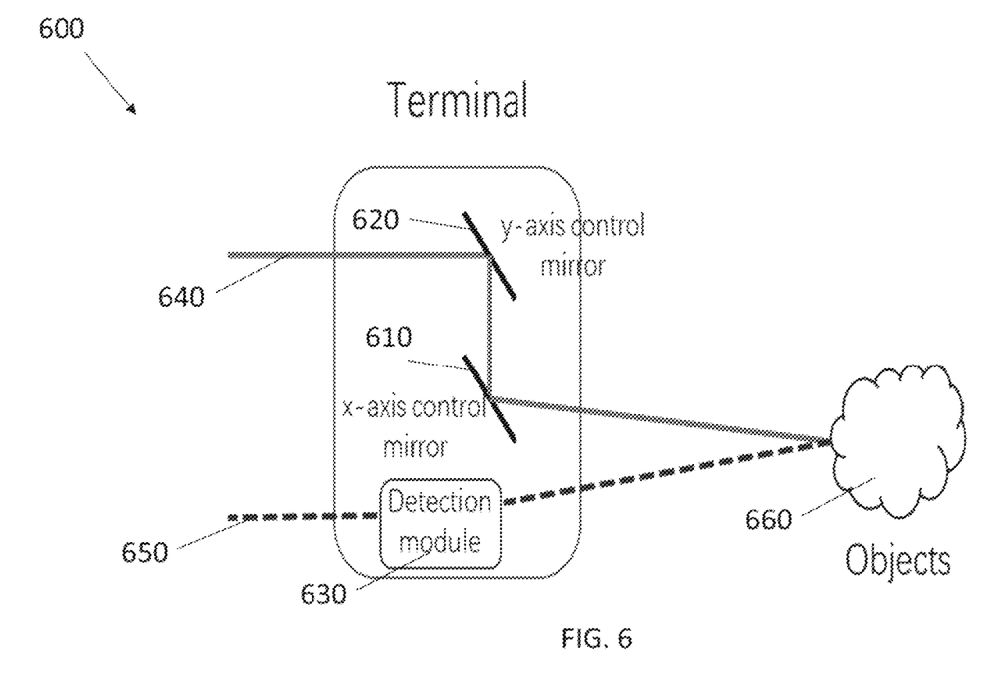
FIG. 6 illustrates a transceiver terminal used in a LiDAR system, according to embodiments of the present invention.

FIG. 6 illustrates a transceiver terminal 600 used in a LiDAR system, according to embodiments of the present invention. The transceiver terminal may use a two-axis control mirror system with an x-axis control mirror 610 and a y-axis control mirror 620 to achieve high-speed 3D scanning and fast adjustment of the scanning angles. The transceiver terminal 610 may also have a detection module 630. The laser and control signal 640 may be deflected using the two-axis control mirror system to the object 660. The data links 650 may pass through the detection module to the object 660.

Figure 7:
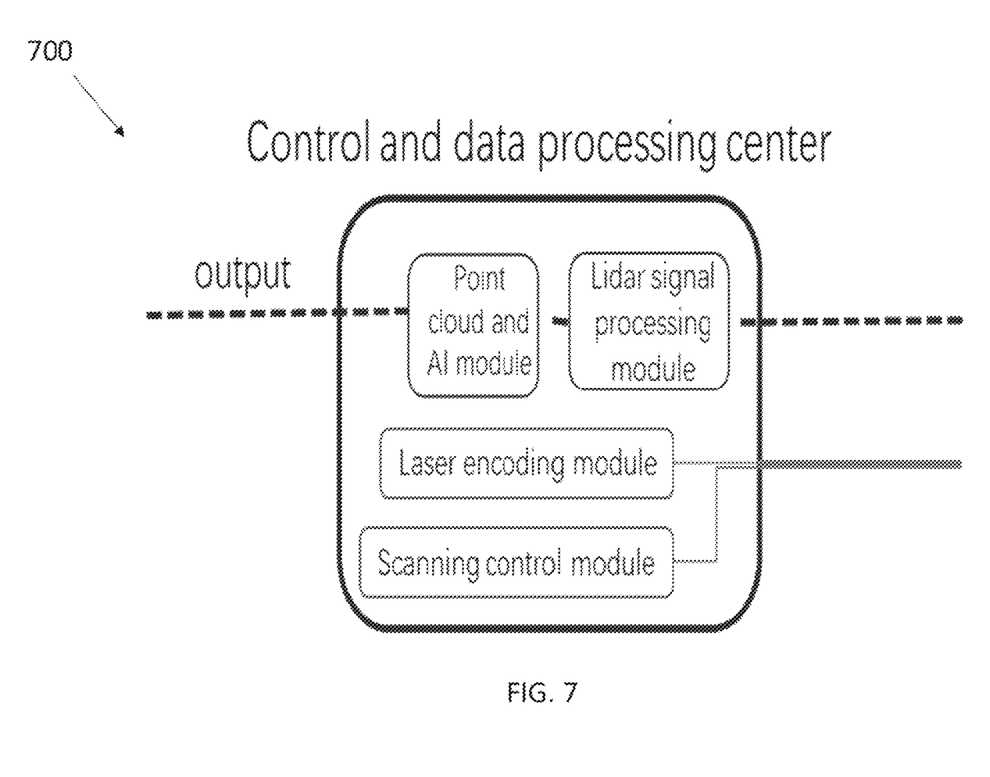
FIG. 7 illustrates a control data processing center used in a LiDAR system, according to exemplary embodiments of the present invention.

FIG. 7 illustrates a control data processing center 700 used in a LiDAR system, according to embodiments of the present invention. The center 700 may be used to encode high dimension information on a traditional laser signal, which can get more information of an object such as velocity. With this high-dimensional information from the LiDAR system, less speculation and conjecture are necessary for an artificial intelligence unit to make sense of its situation in a complex environment. In other words, one can reduce the computation load of the artificial intelligence unit because of the enhanced sensing capability of the invented LiDAR system.

Figure 8:
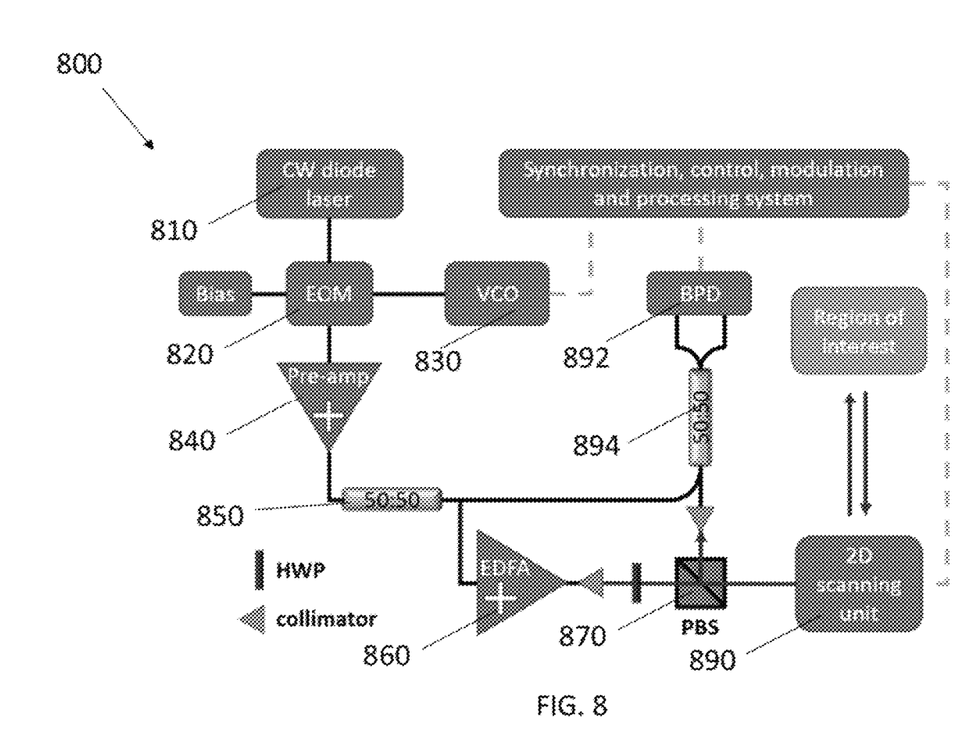
FIG. 8 illustrates a schematic diagram of a dual-sideband FMCW LiDAR system, according to exemplary embodiments of the present invention.
Figure 9:
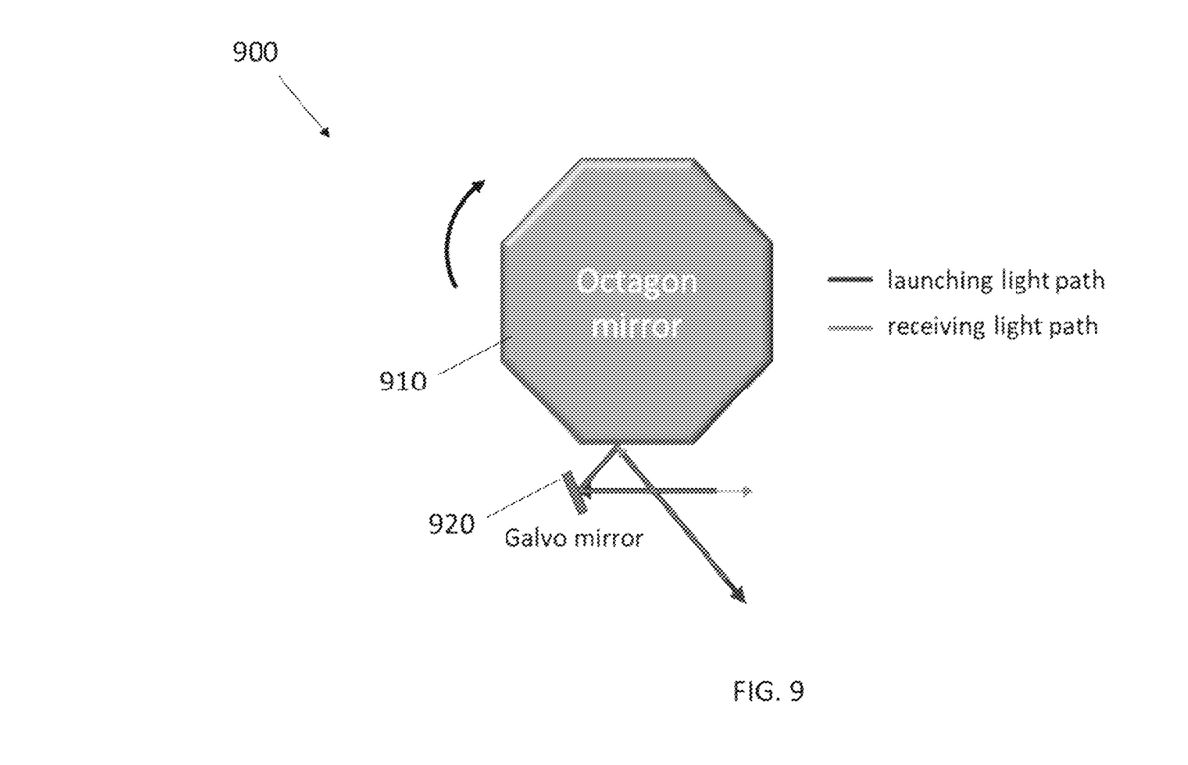
FIG. 9 illustrates a schematic diagram of a 2D scanning unit, according to exemplary embodiments of the present invention.

FIG. 8 illustrates a schematic diagram 800 of a dual-sideband FMCW LiDAR system with a modulated light generation unit, transceiver unit, and control and processing unit. In the modulated light generation unit, a continuous wavelength (CW) diode laser 810 centered at 1550 nm is fed to a 20 GHz electro-optic amplitude modulator (EOM) 820. By sending a radio frequency (RF) signal into the EOM 820, the EOM 820 generates two equal-intensity sidebands from the CW diode laser 810. A voltage-controlled oscillator (VCO) 830 is applied here to generate RF signal for frequency modulation of the CW laser. The driving signal of the VCO 830 is a 500 kHz pseudo-sawtooth signal with a voltage output ranging from 3.5 V to 5.5 V, yielding a RF signal sweeping from 5 GHz to 6 GHz. The 500 kHz is chosen such that the maximum detection range could theoretically reach 300 m. The system could also change the sweeping frequency form 200 kHz to 100 MHz for different detection range while maintaining the same resolution. The wavelength and bandwidth may be selected as long as they complement the features descried herein. By carefully choosing the bias voltage through a power supply with an mV-level accuracy, the carrier frequency is maximally suppressed, so the two sidebands attain maximum intensity. The modulated optical signal may then be amplified by an Erbium-doped fiber pre-amplifier 840 to 20 mW and is split into two paths by a 50:50 fiber coupler 850. One path is fed to a high-power Erbium-doped fiber amplifier (EDFA) 860 and then be boosted to 10 W, the other path is sent into a 2×2 50:50 fiber coupler 870, used as a local reference for ranging measurement. The output of EDFA 860 is connected to the transceiver unit from the bottom to the top of a vehicle via a long SMF-28 fiber and convert to free space beam through a collimator. Then the light beam is expanded to a 2-cm-diameter beam by a beam expander for maximum signal collection. The larger the beam, the better. A polarization beam splitter (PBS) 870 is implemented for collinear detection. Then the output signal is optimized to transverse electric (TE) polarization for maximum utilization of the intensity via a half wave plate (HWP). Then the light is directed to the 2D scanning unit 880 controlled by the control and processing unit. The 2D scanning unit 900, as illustrated in FIG. 9 consists of two components, one is a galvo mirror 910 for vertical steering and a rotating octagon mirror 920 for horizontal steering of the light. The galvo rotational angle is set to achieve up to 20° vertical angle of view. It may also have a zoom-in function for far object detection that could be achieved by changing the rotational angle range of the galvo mirror 920. The position of the galvo mirror 920 and the octagon mirror 910 is carefully set up to achieve a 90° horizontal angle of view. The scan rate of the galvo mirror 920 is determined by a global trigger rate ranging from 10 Hz to 2 Hz. The rotational speed of octagon mirror 910 is set to 3000 rpm, yielding four hundred horizontal scanning lines per second in total. And by changing the trigger rate from 10 Hz to 2 Hz, the resolution of the rendering image could be switched from 40 lines/frame to 200 lines/frame. When the resolution is 200 lines/frame, there may be 1500 points per line and the vertical spatial resolution could reach 0.1° and horizontal spatial resolution could reach 0.06°, thus improving the clarity of the image.

As illustrated in FIG. 8, the control and processing unit may include a balanced photodetector (BPD) 892, a high-speed DAQ card, a high-speed processor, a two-channel arbitrary waveform generator and a two-channel signal generator. The balanced detection technique is incorporated to improve the measurement sensitivity so the dual-sideband FMCW LiDAR system could measure an object with 10% reflectivity at 120 m. The balanced detector may receive two signal paths and cancel out the common noise. The BPD may only detect the signal difference between two paths. The LiDAR system may receive about −70 dBm power from an object with 10% reflectivity at 120 m, which reaches the noise equivalent power of the balanced photodetector. The received signal is coupled with the local reference signal via a 2×2 50:50 fiber coupler 894 and detected by the BPD 892 with 1 GHz bandwidth, which matches with the frequency modulation range of the laser. Any other matching pair of bandwidth and modulation frequency may be used. The polarization of the local reference path is optimized through three rotating paddles of a fiber polarization controller and the power of the two inputs of BPD is adjusted to perfectly equalize by inserting a fiber variable optical attenuator for optimal signal to noise ratio. Then the signal is acquired by the DAQ card with a 300 MHz sampling rate, and then a graphic card assisted real-time fast Fourier transform (FFT) is applied to detect the two electrical frequency peaks of both sidebands, $f_{M,u}=2L/c\Delta/d+f_D$ and $f_{M,d}=2L/c\Delta/d-f_D$, where $\Delta$=VCO sweeping range×VCO sweeping rate. Then the object distance and speed can be simultaneously and unambiguously calculated by averaging and differencing the two frequencies, respectively. At last, the processed signal may be used for point of cloud generation of the region of interest, and real-time rendering on the interface in the vehicle. The arrayed-waveguide grating (AWG) offers control signals for the VCO 830 and galvo mirror. The signal for the VCO 830 may be customized sawtooth signal with higher order terms to compensate the nonlinear sweeping of VCO, and the signal for galvo mirror is a tilted triangular waveform. The shape of the signal could be anything, as long as it is calibrated in the postprocessing. The two-channel signal generator offers a 2-10 Hz pulse signal with 5% pulse duration to the DAQ card to acquire data, and a 300 Hz TTL signal with 50% duty ratio with maximum 2 V output to control the octagon mirror. Accordingly, in some embodiments, the light generation unit and control and signal processing unit described herein and implemented in the car (or any other transportation device, such as planes, ships, etc.) may be under the seat or somewhere else, and the transceiver unit may be mounted on top of the vehicle. The light may be delivered to the transceiver unit through a long fiber cable and the received signal may be sent back to the control and signal processing unit through the long fiber. The 2D scanning unit is controlled by the control unit through a long BNC cable. Under 2D scanning, the received signal may be rendered to a real-time 3D point of cloud and show up on the interface, which may be a display device net to the driver. The transportation device may have the currently available features to transmit the information, both audio and video, to the driver.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

What is claimed is:
1. A dual-sideband frequency-modulated continuous-wave (FMCW) LiDAR system comprising:
 a modulated light generation unit, comprising:
  an electro-optic modulator configured to modulate a continuous wavelength diode laser carrier to simultaneously generate an up-chirped sideband and a down-chirped sideband;
  a voltage-controlled oscillator (VCO) configured to generate a radiofrequency (RF) signal for frequency modulation of the continuous wavelength diode laser carrier and suppress a carrier frequency of the continuous wavelength diode laser carrier;
a fiber coupler configured to split the up-chirped sideband and the down-chirped sideband into a first split light beam and a second split light beam; and
an optical amplifier configured to generate a boosted light beam from the first split light beam;
a transceiver unit configured to receive the boosted light beam, direct the boosted light beam to a scanner, expand the boosted light beam, polarize the expanded and boosted light beam using transverse electric (TE) polarization via a half wave plate (HWP) and receive a received signal reflected from the scanner, wherein the scanner comprises a galvo mirror for vertical steering and a rotating octagon mirror for horizontal steering; and
a control and processing unit comprising a balanced photodetector (BPD), a DAQ card, a processor configured to control one or more parameters of the scanner, the control and processing unit further comprising a waveform generator, and a signal generator.

2. The dual-sideband FMCW LiDAR system of claim 1, wherein the modulated light generation unit further comprises a second fiber coupler configured to receive the second split light beam, wherein the second split light beam is a local reference for ranging measurement.

3. The dual-sideband FMCW LiDAR system of claim 1, The dual-sideband FMCW LiDAR system of claim 1, wherein the parameters comprise any of a rotational angle, a scan rate, and a rotational speed.

4. The dual-sideband FMCW LiDAR system of claim 1, wherein the optical amplifier is Erbium doped.

* * * * *